Aug. 4, 1925.

C. A. STOLTZ 1,548,067

SOIL PULVERIZER

Filed Jan. 17, 1925

2 Sheets-Sheet 1

Inventor:
Cassius A. Stoltz;
By Robert W. Faudti,
Attorney.

Aug. 4, 1925. 1,548,067

C. A. STOLTZ

SOIL PULVERIZER

Filed Jan. 17, 1925 2 Sheets-Sheet 2

Inventor:
Cassius A. Stoltz;
By Robert W. Caudle,
Attorney.

Patented Aug. 4, 1925.

1,548,067

UNITED STATES PATENT OFFICE.

CASSIUS A. STOLTZ, OF GREENVILLE, OHIO.

SOIL PULVERIZER.

Application filed January 17, 1925. Serial No. 3,065.

*To all whom it may concern:*

Be it known that I, CASSIUS A. STOLTZ, a citizen of the United States, residing at Greenville, in the county of Darke, State of Ohio, have invented a new and useful Construction for Soil Pulverizers, of which the following is a full, clear, and comprehensive specification and exposition, the same being such as will enable others to make and use the same.

The object of this invention, broadly speaking, is to provide a device to be employed in connection with breaking plows, by the use of which the soil as it is being turned in the furrow by the mold-board of the plow will be broken up and pulverized, whereby the entire soil lifted by the plow will be aerated and placed in proper planting condition without the use of a harrow or other soil conditioning tools.

Another object is to provide a device or tool for the purposes stated, the same being simple in character, strong and durable in construction, automatic in operation, adjustable to various makes of plows, being self-adjusting to various conditions when in operation, easily attached and detached with relation to a plow, and which can be manufactured and sold at a comparatively low price.

Other objects and particular advantages of the invention will suggest themselves in the course of the following specification.

The preferred means for carrying out the principles of this invention in a mechanically efficient and practical operative manner is shown in the accompanying two-sheets of drawings, in which—

Figure 1:
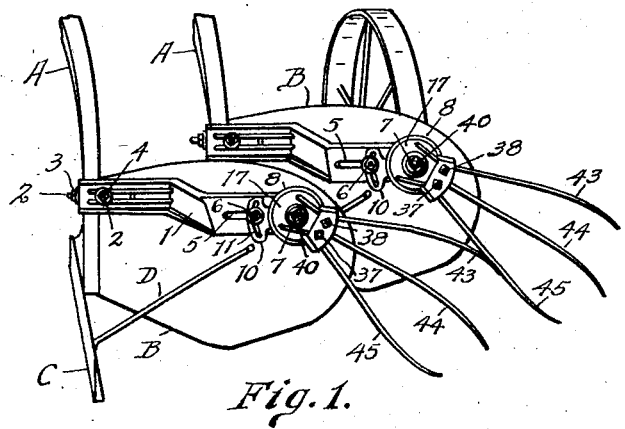
Figure 3:
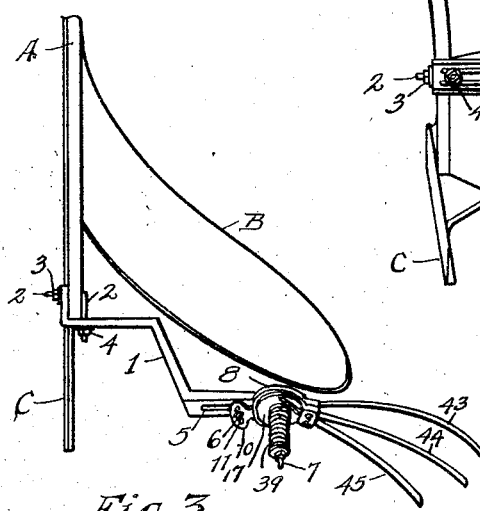
Figure 2:
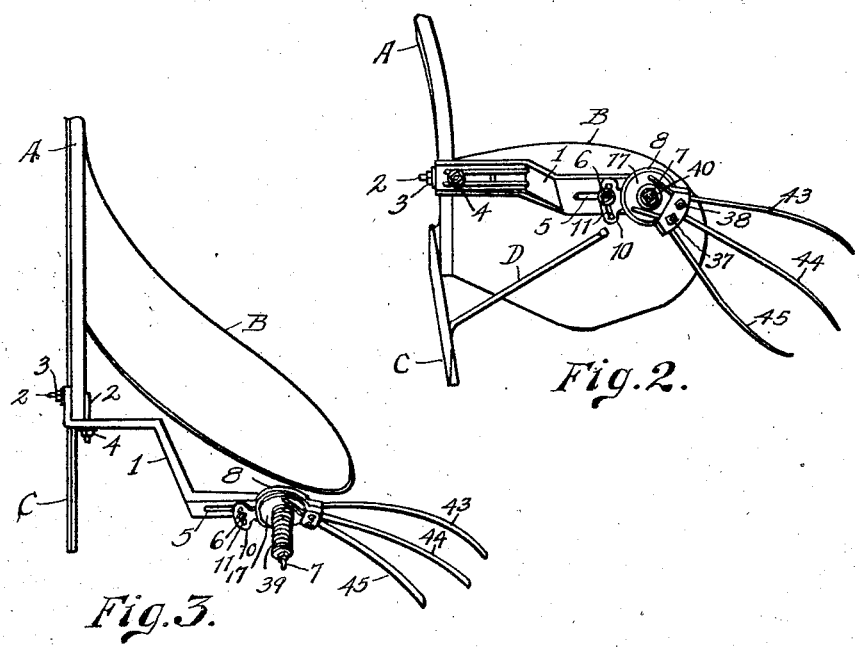
Figure 4:
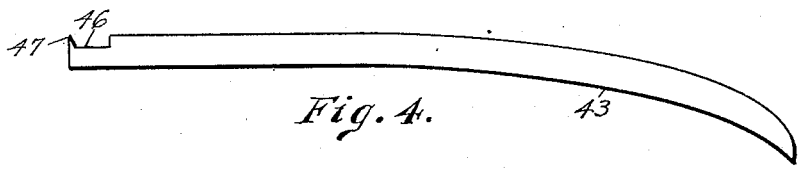
Figure 5:
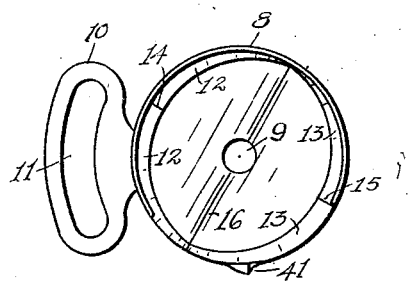
Figure 6:
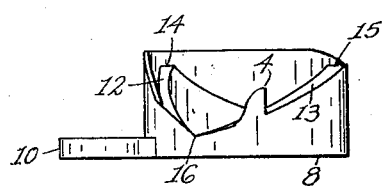
Figure 7:
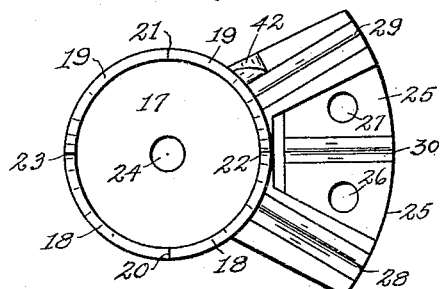
Figure 8:
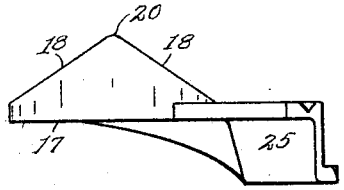
Figures 9, 11:
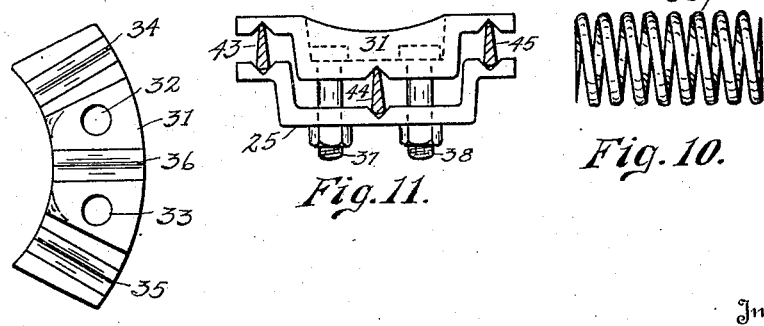
Figure 10:
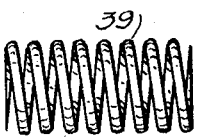

Figure 1 is a perspective rear elevation of a portion of a double or two-furrow plow, showing one of the devices attached to each of the plow beams. Figure 2 shows the device as attached to a single plow beam, as taken in substantially the same position as Fig. 1. Figure 3 is a top plan view, taken at substantially right-angles to Fig. 2. Figure 4 shows one of the blades or fingers alone. Figure 5 is an inside face view of the female member of the cam means. Figure 6 is an edge view of the same. Figure 7 is an inside face view of the male member of the cam means. Figure 8 is an edge view of the same. Figure 9 is an inside face view of the blade-clamping member alone. Figure 10 shows the tension spring alone. And Figure 11 is a rear elevation of the two members of the hand showing the blades, in cross section, secured thereby.

Similar indices denote like parts throughout the several views.

In order that the construction, the operation, and the several advantages of the invention may be more fully understood and appreciated I will not take up a detailed description thereof.

As the plow beams, and each of the devices shown in Fig. 1 are identical with each other, therefore the description will refer to but one, with the other indicated by like reference characters.

It is to be understood that the device may be employed with a single plow or a plurality of such devices with a gang of plows, each plow being equipped with one of the pulverizing devices.

In the drawings letter A denotes the plow beam of the plow proper the mold-board of which is indicated by letter B. Letter C denotes the land-side of the plow, the rear portion of which is connected to the mold-board by the brace D. However all of said parts are shown merely to make clear the relative position of the device to such parts, which parts may be variously changed as desired.

The invention proper comprises an arm 1, which may be of various shapes in order to meet conditions with relation to the plow with which it is to be employed, but in each instance the general direction of said arm is rearward from the beam and toward the mold-board as is indicated in the drawings.

As shown in this instance the arm 1 is of elongated Z-shape, with the front end forming a right-angle, to contact with two sides of the beam A.

The front end portion of the arm 1 is detachably connected to the substantially vertical portion of the beam A by means of the right-angular bolt 2, both ends of which are threaded to receive the respective nuts 3 and 4, there being horizontal slots formed in the arm 1 through which may pass the threaded portions of said bolt. By the above it is apparent that the arm 1 contacts with two sides of the beam A, while the bolt 2 contacts with the other two sides of said beam. Now by tightening the nuts 3 and 4 it will be seen that the arm 1 will be rigidly attached to the beam A, where it will occupy substantially the position shown in Figs. 1, 2 and 3, where it is adapted to be adjusted as occasion requires. Formed in the rear portion of the arm 1, extending longitudinally thereof, is a slot 5, to receive the spaced apart bolts 6 and 7, the latter being comparatively long, for the purpose hereinafter explained.

The female member of the cam means comprises the circular base 8, the back of which rests upon the face of the arm 1, with the bolt 7 extending through the aperture 9 formed through the center thereof. Also resting on the face of the arm 1 and formed integral with the base 8, is the slotted ear 10, having the curved slot 11 therethrough, through which passes the bolt 6. The said base 8 is formed notched through the center of its face, thereby forming two inclined surfaces, 12 and 13, each extending up to its respective peak, 14 and 15 in its center, and extending to the central line of convergence 16, which line 16 extends through the aperture 9; both halves of each of the inclined faces 12 and 13 meet at said line 16, as indicated in Figs. 5 and 6.

The male member of the cam means comprises the circular base 17, of substantially the same diameter as the base 8, the same having a flange extending at right-angles to the base 17. The edge of said flange forms two contact surfaces 18 and 19, each sloping inward at an angle to their respective peaks 20 and 21 with the ends meeting at the points 22 and 23, which points are on a line with the center of the central aperture 24, which latter is formed through the center of the base 17.

Formed integral with and radiating from one side of the base 17 and centrally in a line with the peaks 22 and 23, is the member 25 of the hand, the central portion of which is on a plane different from that of the side portions thereof, whereby the member 25 is formed substantially U-shaped in cross section, with the periphery thereof formed on a curve concentric with the periphery of the base 17. Bolt apertures 26 and 27 are formed through the central portion of the member 25, for purposes hereinafter explained.

Formed in the face of the member 25 are three V-shaped channels, 28, 29 and 30, the two former being in the side portions, and the latter in the center of the central portion. Said channels are formed radially with the aperture 24 as their focal point.

Numeral 31 denotes the clamping member of the hand, and it has a central portion which fits in the space between the end portions of the member 25, and it has two wing portions which correspond with the end portions of the member 25. The contact face of the member 31 is adapted to fit the face of the member 25. Two apertures, 32 and 33, are formed through the central portion of the member 31, and they are adapted to register with the apertures 26 and 27, respectively. Also three V-shaped channels 34, 35 and 36 are formed across the face of the member 31, and they are adapted to register with the channels 28, 29 and 30.

The member 31 is adapted to be secured to the member 25 by the bolts 37 and 38, for the purpose hereinafter explained.

Numeral 39 denotes a helical spring which loosely encircles the bolt 7, with one end contacting with the outer face of the base 17, with which it is retained in expansive contact by the nut 40, with a washer therebetween.

Numeral 41 denotes a tooth, which is integral with the periphery of the base 8, where it is adapted to engage with the lug 42 which latter is located at the juncture of the rim of the base 17 and with the member 25, with which it is integral.

In this instance three cutting blades or fingers, 43, 44 and 45, are provided, which blades are substantially identical with each other, except as to their length and their curvatures.

The base of each blade is reduced in width, that is, the cutting edge portion is omitted, thereby forming an elongated indentation 46 extending to near the end of the base of the blade, where a tooth 47 is formed, all as shown in Fig. 4. Said indentation and tooth provide the means whereby the blade may be rigidly secured in operative position.

From the above it will be noticed that the device has no physical connection with the mold-board B or with any other part of the plow, except the beam A, although it is near to and back of the mold-board when it is in operative position as in Figs. 1, 2 and 3. The functioning of the blades above mentioned is the paramount object of the invention, and means for retaining said blades in proper operative position is another important feature of the device.

It is now to be understood that as the plow is drawn forward in the usual manner, with the mold-board turning the soil into the furrow previously made by the plow, that as the soil is leaving the tail-end of the mold-board, and is in the act of turning over, that it will be engaged by the blades and cut and broken up and thoroughly pulverized and aerated, whereby it will be deposited in the furrow in proper condition for planting therein.

It has been found that in order to give the best results and to prevent breakage of the device that there should be means provided for the blades to be permitted to move slightly, with relation to the mold board, when considerable pressure is applied and then to automatically adjust themselves after such pressure is removed. This result is accomplished by allowing the hand to turn slightly when the blades encounter an object such as a large stone, which would be impossible for them to pulverize.

The results above mentioned are accomplished by the cam means described, wherein the surfaces 18—19 are always in contact with the surfaces 12—13, by reason of the spring 39, and whereby if the hand carrying the blades should turn then said surfaces 18 and 19 will slide in contact with the surfaces 12 and 13, but by reason of said surfaces being at acute angles with relation with the direction of rotation, it is evident that when the pressure on the hand is released that the peaks 20—24 will, by means of the spring 39, be forced back into the channel formed at the line 16, thereby always causing the hand and the blades to return to their normal operative position when released.

While the hand is automatically adjustable, as above set forth, it is also manually adjustable by simply loosening the bolt 6, and then turning the hand up or down to change the position of the bolt 6 in the slot 5, and then when the hand is adjusted as desired, the bolt 6 is again made tight, which will hold the hand and the blades in their adjusted positions.

In order to prevent the hand from turning further than it should, that is, to prevent the peaks 20 and 21 from turning beyond the peaks 14 and 15, the tooth 41 and the lug 42 are provided, whereby when the hand has turned as far as it should then the lug 42 will come into contact with the tooth 41 and thereby prevent further rotation of the hand in that direction.

It is to be understood that various changes may be made in the several details herein set forth, without departing from the principles of the invention and without sacrificing any of the advantages thereof which are new and useful.

Having now fully show and described the invention, what is claimed as new and useful is—

1. In combination with a plow-beam having a mold-board connected thereto, an arm detachably connected at its forward end with the plow beam, a hand pivoted to and connected by cam means with the rear end of the arm, spring means for retaining the hand in normal position but permitting it to turn on its pivot and causing the cam means to return the hand to normal position after being turned therefrom, and a plurality of blades extending rearwardly from said hand.

2. In combination with a plow-beam having a mold-board in connection therewith, an arm connected at its forward end to the plow-beam and extending rearward back of the mold-board without connection therewith, a hand pivoted to the rear end of said arm, cam means for permitting the hand to turn out of normal position, a spring for automatically returning the hand to normal position in the cam means, blades detachably secured in the hand and extending rearwardly and curving into the line of the mold-board.

3. A soil pulverizer comprising an arm, cam means comprising a female member adjustably secured to said arm, a male member of the cam means adapted to rotate in connection with the female member, resilient means for retaining said members in contact with each other, a pivot concentric with the female member, the male member, and said resilient means for limiting the rotation of one of said members in one direction with relation to the other member, a clamping hand carried by the male member, and a plurality of blades detachably secured by said clamping hand.

CASSIUS A. STOLTZ.